United States Patent
Okada et al.

(10) Patent No.: US 7,817,582 B2
(45) Date of Patent: *Oct. 19, 2010

(54) PATH CONTROLLER, PATH CONTROL METHOD, AND PROGRAM THEREFOR

(75) Inventors: Masakuni Okada, Atsugi (JP); Michihiko Kondoh, Machida (JP)

(73) Assignee: International Business Machines Corporation, Armonk, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/103,936

(22) Filed: Apr. 16, 2008

(65) Prior Publication Data

US 2008/0259933 A1 Oct. 23, 2008

Related U.S. Application Data

(63) Continuation of application No. 10/883,212, filed on Jul. 1, 2004, now Pat. No. 7,460,540.

(30) Foreign Application Priority Data

Jul. 8, 2003 (JP) .............................. 2003-272070

(51) Int. Cl.
*H04L 12/56* (2006.01)
(52) U.S. Cl. .................. 370/255; 370/395.31
(58) Field of Classification Search ........................ None
See application file for complete search history.

(56) References Cited

U.S. PATENT DOCUMENTS

| | | | | |
|---|---|---|---|---|
| 5,463,777 | A | * | 10/1995 | Bialkowski et al. ................. 1/1 |
| 6,404,752 | B1 | * | 6/2002 | Allen et al. .................. 370/335 |
| 6,516,319 | B1 | | 2/2003 | Benayoun et al. |
| 6,947,931 | B1 | | 9/2005 | Bass et al. |
| 2008/0181139 | A1 | * | 7/2008 | Rangarajan et al. ......... 370/256 |

FOREIGN PATENT DOCUMENTS

JP    2001-357071    12/2001

OTHER PUBLICATIONS

Wang, et al., "Implementation and Evaluation of Parallel R-Tree on Parallel Object Database System ShusseUo," pp. 92-103., Aug. 1999, vol. 40, No. SIG6 (TOD 3).

* cited by examiner

*Primary Examiner*—Chirag G Shah
*Assistant Examiner*—Steve Young
(74) *Attorney, Agent, or Firm*—Mark E. McBurney; Schubert Law Group PLLC

(57) ABSTRACT

A path controller 10 creates a logical tree LT having a plurality of member trees MT1 and MT2 within a routing table 52 at the time of initial setting. Direct tables DT1 and DT2 for the member trees MT1 and MT2 have the same DT entries (root). Unlike a conventional tree in which a single tree is constructed for the same root, since the present invention is such that the plurality of member trees are constructed for the same root, the number of nodes N passed through before reaching leaves L is reduced. At the time of path search, a plurality of search engines SE1 and SE2 search the member trees MT1 and MT2, respectively.

9 Claims, 12 Drawing Sheets

PATH CONTROLLER, PATH CONTROL METHOD, AND PROGRAM THEREFOR

This application is a continuation of U.S. patent application Ser. No. 10/883,212, filed Jul. 1, 2004 now U.S. Pat. No. 7,460,540.

FIELD

The present invention relates to a path controller and more particularly to a path controller for receiving a frame from a plurality of host computers within a network or from other networks and transferring the frame.

BACKGROUND

One of path search techniques performed with path controllers such as a router and a layer 3 switch is a tree method. In the tree method, destination address information, such as MAC addresses and IP addresses, is arranged in a tree structure. At the time of a path search, a path controller follows node points (hereinafter called "nodes") according to a search key (address information) and acquires path information when reaching an external node (hereinafter called a "leaf"). FIG. 10 shows an example of a tree structure when the path controller has path information for 7-bit destination address information shown in Table 1.

TABLE 1

| DESTINATION ADDRESS INFORMATION |
| --- |
| 0010100 |
| 0100010 |
| 0110000 |
| 1000010 |
| 1000011 |
| 1000111 |
| 1010000 |
| 1010001 |
| 1100010 |
| 1110110 |

The tree of FIG. 10 assumes the form of a Patricia tree. The numerical value within each node N indicates the number of high-order bits that are common to every piece of destination address information registered with leaves L belonging to the node N. For example, when considering a node N3, destination address information within the leaves L belonging to the node N3 includes "1000010," "1000011," and "1000111," and the high-order 4 bits, "1000," of the three pieces of destination address information are common. Therefore, the numerical value within the node N3 is set to "4."

The edge (branch) is divided into two from the node N3, depending on whether the numerical value of the fifth high-order bit of the destination address information within the leaves L belonging to the node N3 is "0" or "1." Among the above-mentioned three pieces of destination address information, the fifth high-order bit of "1000010" and "1000011" is "0," indicating that the leaves L including these destination address information belong to the edge of "0." On the other hand, since the fifth high-order bit of "1000111" is "1," the leaf L having this destination address information belongs to the edge of "1."

When receiving a frame having destination address information "1000010" from the outside, a conventional path controller extracts the destination address information "1000010" from the received frame. The path controller then performs a path search in the Patricia tree shown in FIG. 10 by using the extracted destination address information as a search key. In FIG. 10, the path search starts at a root R. Since the first high-order bit of the search key is "1," it goes to the edge of "1" from the root R, and reaches a node N1. The numerical value within the node N1 is "1" (namely, the first high-order bit of all the destination address information on the leaves L belonging to the node N1 is "1"), so that either of the edges "0" and "1" emanating from the node N1 is determined by the numerical value of the second high-order bit. Then, since the second high-order bit of the search key ("1000010") is "0," it goes to the edge of "0" and reaches a node N2. The numerical value within the node N2 is "2," so that, based on the numerical value "0" of the third high-order bit of the search key, it goes the edge of "0" and reaches a node N3. It teaches a node N4 in the same manner, and a leaf L1 is finally searched for. In addition to the destination address information, path information indicating the location where a frame having the destination address information should go is registered in each leaf L. The path controller acquires the path information within the leaf L1, and transfers the received frame based on the path information.

Thus, in the search method for the conventional path controller, the plurality of nodes N1 to N4 need to be passed through during the search. Since the more the number of passing nodes N the longer the search time, it is preferable that the number of passing nodes is small.

Japanese Patent Laid-Open No. 2001-357071 proposes path search using a tree structure. In the patent document, the path search is performed using a tree structure having a "direct table." FIG. 11 shows the tree structure based on the patent document for the plurality of leaves L including the destination address information on the table 1. Referring to FIG. 11, the tree structure having the direct table includes a direct table DT instead of the root R in FIG. 10. In the direct table DT, eight combinations of high-order 3 bits of destination address information are registered (hereinafter, the combinations are called the DT entries 0 to 7). When two or more leaves L belong to the same DT entry, a node(s) N is provided in the same manner as in the conventional method. In FIG. 11, since three leaves L (destination address information="1000010," "1000011," "1000111") belong to the DT entry 4 (with high-order 3 bits of "100"), the DT entry 4 has nodes N3 and N4 in the same manner as in FIG. 10. Providing the direct table DT can reduce the number of nodes N (hereafter called the number of node-stages) which must be passed through before reaching the leaves L during the path search. For example, it is necessary to pass through four nodes N1 to N4 in the tree structure of FIG. 10 before reaching the leaf L1 having the destination address information "1000010" during the path search. In contrast, in the tree structure of FIG. 11, since there is the direct table DT, only the two nodes N3 and N4 need to be passed through after starting from the DT entry 4 until reaching the target leaf L1. Thus, the tree structure having the direct table DT can reduce the number of node-stages, thereby reducing the search time.

However, even in the tree structure having the direct table DT, the number of node-stages N can vary depending on the destination address information included in a plurality of leaves L. FIG. 12 shows a tree structure having the direct table DT when eight leaves L belong to one DT entry. In FIG. 12A, the number of leaves L belonging to nodes N10 and N11 is four, respectively, showing a case where the leaves L are uniformly distributed. In this case, the number of node-stages passed through before reaching a leaf L2 in this figure is two. On the other hand, FIG. 12B shows a tree structure when leaves L are distributed in the most nonuniform manner possible. In FIG. 12B, the number of node-stages for reaching the leaf L2 is seven. Therefore, even in the tree structure having the direct table DT, when a deviation of leaves occurs in the tree structure, the number of node-stages increases to increase the path search time.

SUMMARY

It is an object of the present invention to provide a path controller capable of controlling a deviation of leaves for a tree structure of path information. It is another object of the present invention to provide a path controller capable of reducing path search time. According to an aspect of the present invention, there is provided a path controller for receiving a frame from a plurality of host computers within a network or from other networks and transferring the frame, comprising a routing table, a search unit, and a receiving and transferring unit. The routing table contains a plurality of leaves including destination address information and path information corresponding to the destination address information stored in a tree structure. The tree structure includes a plurality of member trees having a common root. The search unit searches the plurality of member trees for leaves by using the destination address information included in the received frame as a search key. The receiving and transferring unit receives the frame and transferring the received frame on the basis of the path information included in the leaves searched for by the search unit.

In the path controller according to the present invention, the tree structure of the routing table includes the plurality of member trees having the common root. Consequently, the number of leaves registered with each of the member trees is low relative to the number of leaves registered with a single tree provided for a root. It is because a plurality of leaves conventionally registered with a single tree can be distributed to the plurality of member trees. It also decreases the number of nodes passed through before reaching the leaves during the search, thereby preventing a deviation of the leaves in the tree structure.

Preferably, the common root includes a plurality of direct tables. The plurality of direct tables record combination information on combinations of high-order N bits (where N is a natural number) within the destination address information. The plurality of direct tables correspond to the plurality of member trees in such a manner that both mutually have the same combination information.

In this case, since the plurality of member trees have the direct tables, the number of nodes can be reduced. Further, the combination information within the direct table for each member tree is the same, so that conventionally one tree structure can be divided into the plurality of member trees. Consequently, the number of leaves for each tree is small relative to that for the conventional tree structure. It can also reduce a deviation of the leaves.

Preferably, the search unit includes a plurality of search engines. The plurality of search engines are provided corresponding to the plurality of member trees, such that each search engine searches each corresponding member tree for leaves by using the destination address information included in the received frame as the search key.

In this case, the path controller according to the present invention searches the plurality of member trees using the plurality of search engines. At this time, each search engine searches a different member tree. It can considerably reduce search time compared to the conventional case where a single tree is formed for the same root within the routing table.

Preferably, the path controller further includes a creation unit. The creation unit creates the tree structure including the plurality of member trees within the routing table based on information on the number of member trees inputted from the outside.

In this case, any number of member trees can beset within the routing table. It is further preferable that the creation unit receives a new leaf from the outside, and registers the new leaf with a member tree having the smallest number of registered leaves among the plurality of member trees.

In this case, the leaves registered with each of the plurality of member trees within the same tree structure are divided evenly in number among the member trees. Consequently, the number of nodes passed through before reaching the leaves in each member tree can be set equally among the member trees.

It is further preferable that the path controller includes a registration-information file. The registration information file stores registration destination information indicating a member tree with which the new leaf is registered. When receiving the new leaf from the outside, the creation unit registers the new leaf based on the registration destination information, and after registration, changes the registration destination information to indicate another member tree having the smallest number of registered leaves.

In this case, if the path controller registers the leaf based on the registration destination information pre-registered in the registration information file, the leaves to be registered with each member tree can be uniformly distributed among the member trees.

After registering the new leaf, the creation unit preferably changes the registration destination information by the round robin method.

In this case, since the registration destination information is changed based on the round robin method, a member tree having the smallest number of registered leaves is always set as the registration destination information.

According to another aspect of the present invention, there is provided a path control method using a path controller for receiving a frame from a plurality of host computers within a network or from other networks and transferring the frame. The path controller comprises a routing table for storing a plurality of leaves including destination address information and path information corresponding to the destination address information in a tree structure, and a search unit. The tree structure includes a plurality of member trees having a common root. The path control method comprises receiving the frame from the outside, extracting the destination address information from the frame, the search unit searching the plurality of member trees by using as the search key the destination address information extracted, and when a leaf corresponding to the search key is searched, the frame is transferred based on the path information included in the leaf searched for.

The path controller according to the present invention forms the tree structure of the routing table from the plurality of member trees having the common root. Consequently, the number of leaves registered with each of the member trees is small relative to the number of leaves registered with a single tree provided for a root. It is because a plurality of leaves conventionally registered with a single tree can be distributed to the plurality of member trees. It also decreases the number of nodes passed through before reaching the leaves during the path search, thereby preventing a deviation of the leaves in the tree structure.

Preferably, the common root includes a plurality of direct tables. The plurality of direct tables record combination information on combinations of high-order N bits (where N is a natural number) within the destination address information. The plurality of direct tables correspond to the plurality of member trees in such a manner that both mutually have the same combination information.

In this case, since the plurality of member trees have the direct tables, the number of nodes can be reduced. Further, the combination information within the direct table for each member tree is the same, so that conventionally one tree structure can be divided into plurality of member trees. Consequently, the number of leaves for each tree is small relative to that for the conventional tree structure. It can also reduce a deviation of the leaves.

Preferably, the search unit includes a plurality of search engines, such that each search engine searches each corresponding member tree in the searching step. In this case, the path controller according to the present invention searches the plurality of member trees using the plurality of search engines. At this time, each search engine searches a different member tree. It can considerably reduce search time compared to the conventional case where a single tree is formed for the same root within the routing table.

Preferably, the path control method further comprises a step of receiving a new leaf from the outside, and a step of registering the new leaf with a member tree having the smallest number of registered leaves among the plurality of member trees. In this case, the leaves registered with each of the plurality of member trees within the same tree structure are divided evenly in number among the member trees. Consequently, the number of nodes passed through before reaching the leaves in each member tree can be set equally among the member trees.

It is further preferable that the path controller includes a registration information file for storing registration destination information indicating a member tree with which the new leaf is registered, and the registration step of the path control method includes a step in which the new leaf is registered based on the registration destination information, and after registration, the registration destination information is changed to indicate another member tree having the smallest number of registered leaves.

In this case, if the path controller registers the leaf based on the registration destination information pre-registered in the registration information file, the leaves to be registered with each member tree can be uniformly distributed among the member trees.

Preferably, the registration destination information is changed by the round robin method. In this case, since the registration destination information is changed based on the round robin method, a member tree having the smallest number of registered leaves is always set as the registration destination information.

Another embodiment comprises a program product comprising a media on which a computer program is recorded, said computer program including a first code module providing a routing table for storing a plurality of leaves including destination address information and path information corresponding to said destination address information in a tree structure said tree structure including a plurality of member trees having a common root; a second code module for receiving at least one frame; a third code module for extracting the destination address information from said at least one frame; a fourth code module for searching, with a search means, said plurality of member trees by using said destination address information extracted as the search key; and a fifth code module for transferring said frame based on the path information included in said leaf searched for when a leaf corresponding to said search key is searched.

DESCRIPTION

Figure 1B:
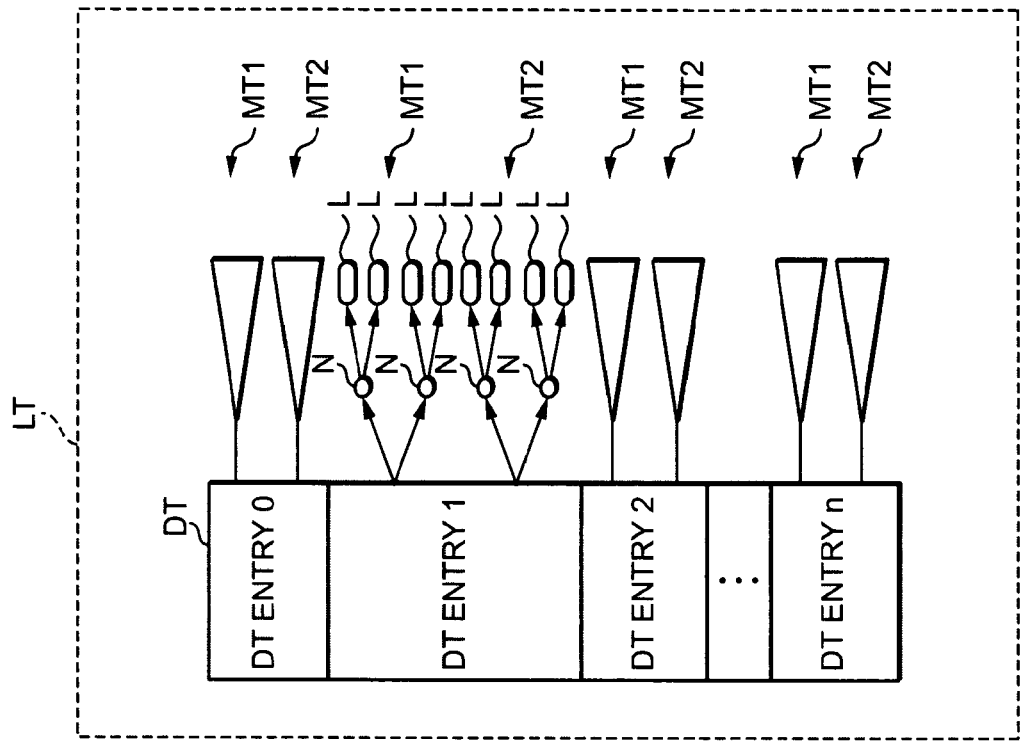
FIG. 1 It is a conceptual diagram for explaining a logical tree structure according to an embodiment of the present invention.

Referring to the accompanying drawings, an embodiment of the present invention will how be described in detail. In the drawings, identical or equivalent portions are given the same reference numerals to invoke the same descriptions.

A tree structure used for path search in the embodiment of the present invention is of logical tree structure composed of a plurality of member trees. The following describes the logical tree structure.

Figure 1A:
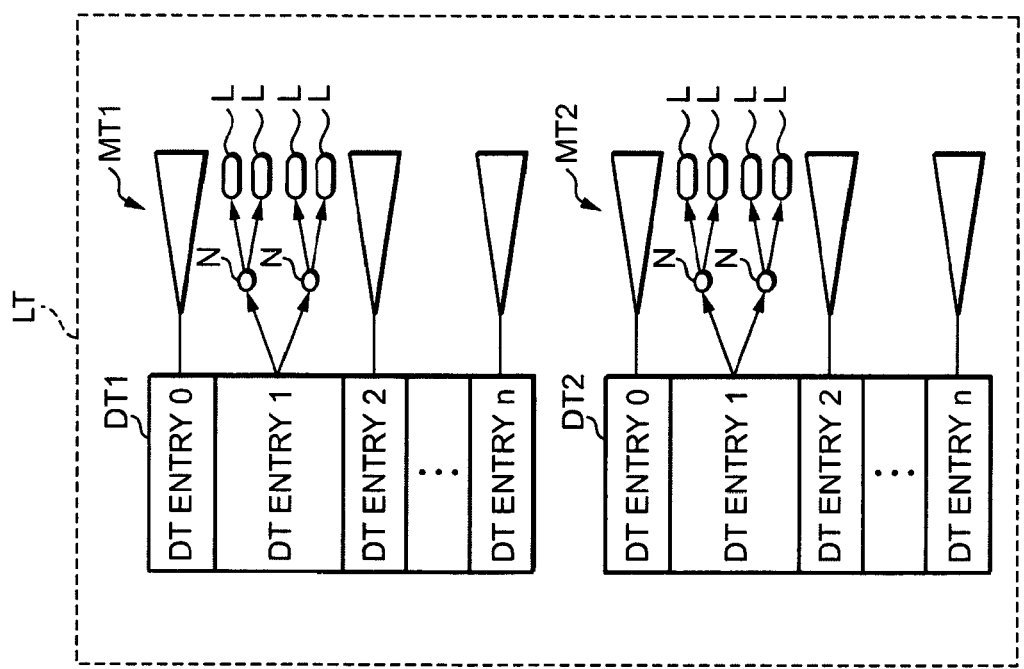

Referring to FIG. 1A, a logical tree LT is a tree structure composed of a plurality of member trees MT1 and MT2. Direct tables DT1 and DT2 for the two member trees MT1 and MT2 include the same DT entries 0 to n (where n is a natural number). In other words, the conventional structure contains one tree per root (direct table DT in FIG. 1), while the embodiment is such that two or more same roots are prepared to construct trees (member trees MT) for the roots, respectively. The member trees MT1 and MT2 are so constructed as to include the same number of leaves L. Note here that, although the structure in FIG. 1A prepares a root (direct table DT1 or DT2) for each member tree MT, the member trees MT may share one root (direct table DT) as shown in FIG. 1B. A method of creating the member trees MT will be described later.

Figure 2B:
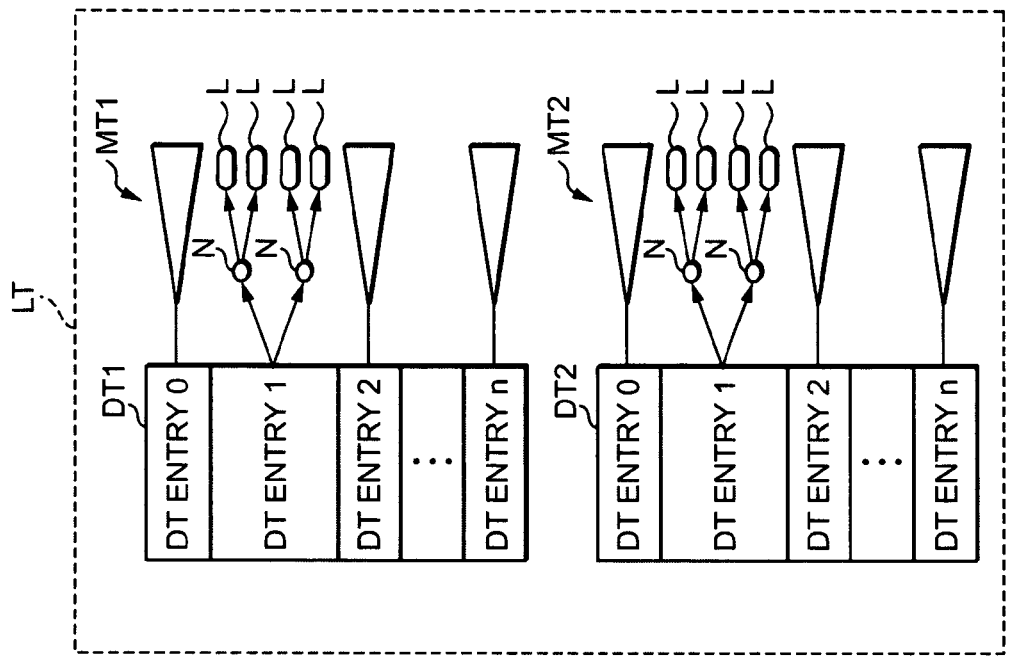
FIG. 2 It is another conceptual diagram for explaining the logical tree structure according to the embodiment of the present invention.
Figure 2A:
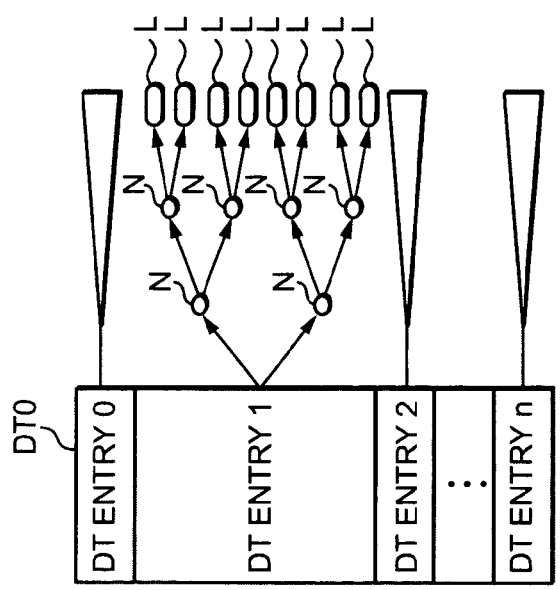

FIG. 2A shows a conventional tree structure using a direct table DT0. In this case, the number of leaves L belonging to DT entry 1 within the direct table DT0 is set to eight, and the number of node-stages passed through before reaching each leaf L is set to two. FIG. 2B shows a case where the tree structure having the direct table DT0 shown in FIG. 2A is represented in a logical tree structure according to the present invention. In FIG. 2B, the logical tree LT contains two member trees MT1 and MT2. The member trees MT1 and MT2 include direct tables DT1 and DT2, respectively. The direct tables DT1 and DT2 include the same DT entries 0 to n as the direct table DT0. In this case, the number of leaves L belonging to the DT entry 1 of the member tree MT1 and the number of leaves L belonging to the DT entry 1 of the member tree MT2 are both four, half that of the case in FIG. 2A. Consequently, the number of node-stages is also reduced to one.

As mentioned above, when the number of leaves belonging to a DT entry is the same, the logical tree structure composed of the plurality of member trees MT reduces the number of node-stages passed through before reaching a target leaf L, compared to the conventional tree structure.

Figure 3A:
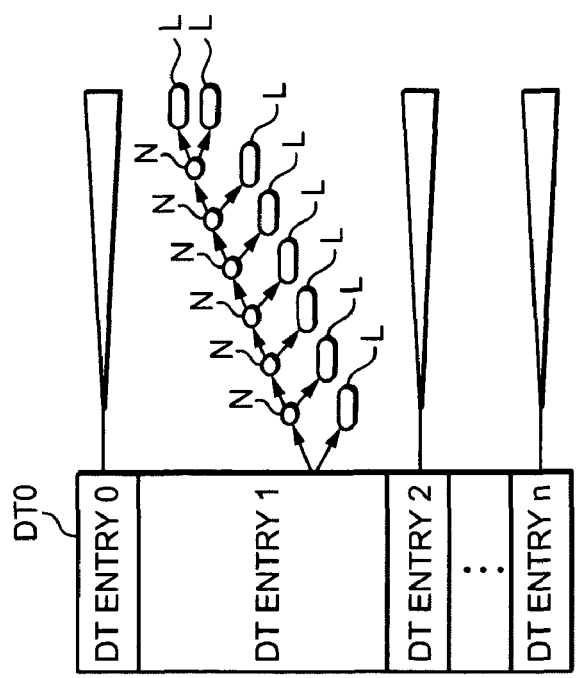
FIG. 3 It is still another conceptual diagram for explaining the logical tree structure according to the embodiment of the present invention.
Figure 3B:
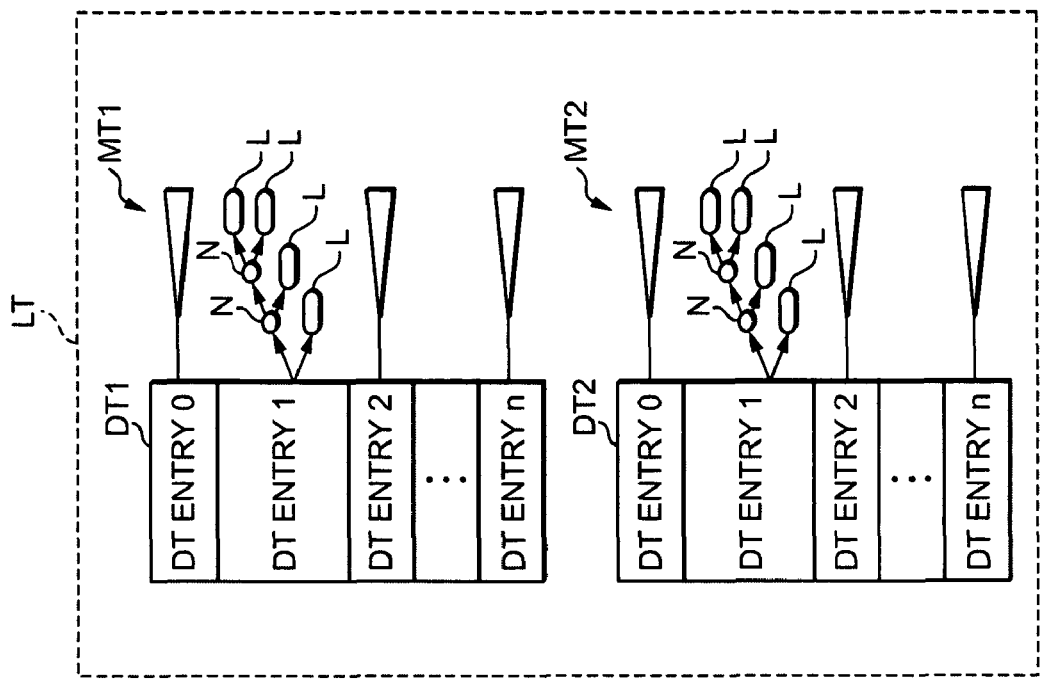

FIG. 2 shows a tree structure in which the leaves L are most uniformly distributed. On the other hand, FIG. 3 shows a tree structure in which the deviation of leaves L becomes the largest. FIG. 3A shows the conventional tree structure in which the maximum number of node-stages passed through from the DT entry 1 to a leaf L is six. On the other hand, FIG. 3B shows the logical tree structure having the two member trees MT1 and MT2. In FIG. 3B, the number of leaves belonging to the DT entry 1 is four in both of the member trees MT1 and MT2, thereby reducing the maximum number of node-stages passed through before reaching a leaf to two.

Thus, the logical tree structure can reduce the number of node-stages passed through before reaching a target leaf L. Further, since the logical tree LT is composed of the plurality of member trees MT, if the path controller is provided with a plurality of search engines, the member trees MT can be searched in parallel. In this case, search time is reduced. Although the tree structure having the direct table DT as the root R is described in FIGS. 1 to 3, the present invention is also applicable to a tree structure having a normal root R. The present invention is further applicable to any search tree other than the Patricia tree.

Figure 4:
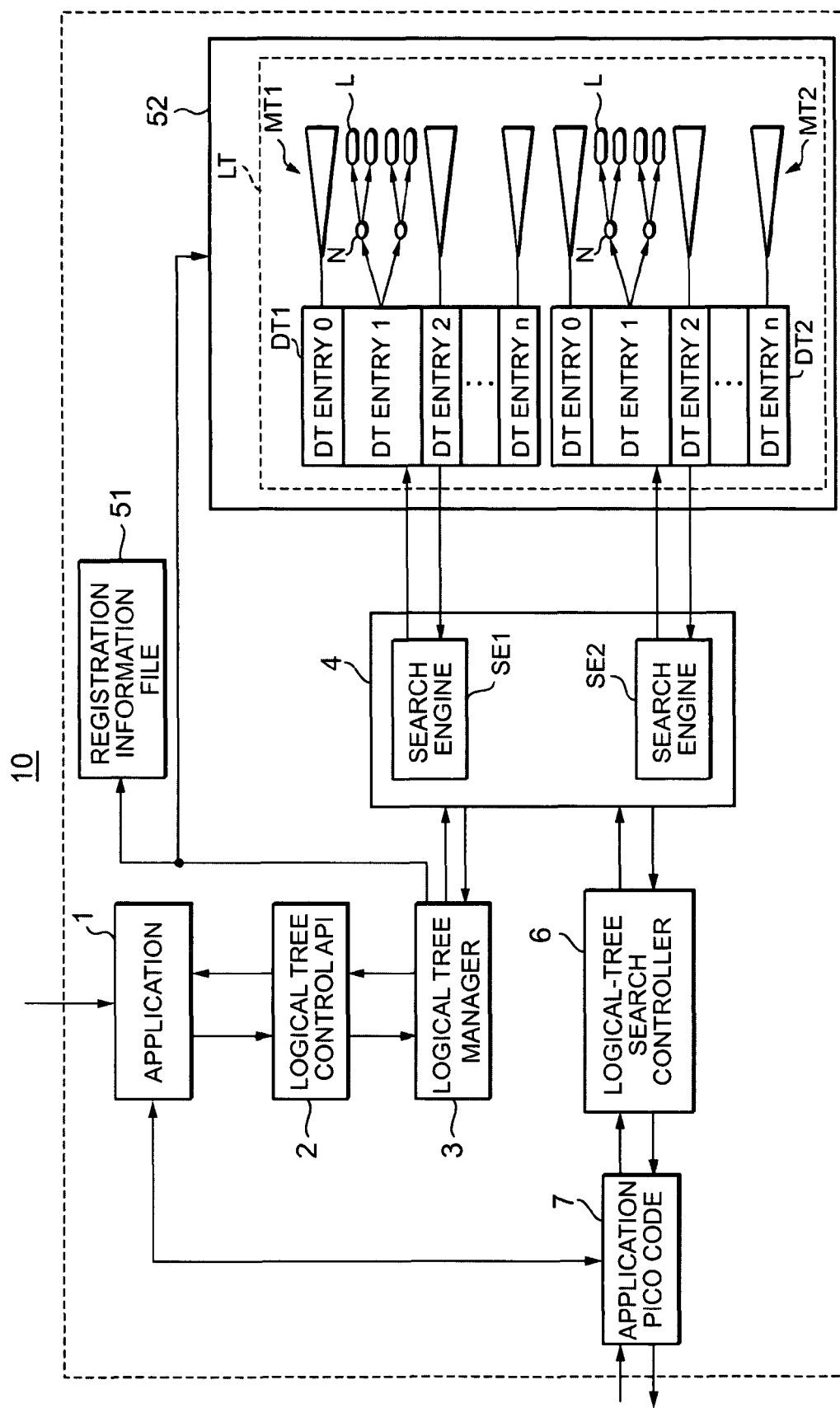
FIG. 4 It is a block diagram showing the general structure of a path controller according to the embodiment of the present invention.

The following describes a path controller including a logical tree in a routing table. Referring to FIG. 4, a path controller 10 includes an application 1, a logical tree control API (Application Program Interface) 2, a logical tree manager 3, a search unit 4, a registration information file 51, a routing table 52, a logical-tree search controller 6, and an application pico code 7. The application 1, the logical tree control API 2, and the logical tree manager 3 create the logical tree LT including a plurality of member trees MT in the routing table 52. The application pico code 7 receives a frame from a plurality of host computers within a network or from other networks and transfers the received frame based on path information.

The application 1 manages the logical tree LT registered in the routing table 52. Specifically, the application 1 instructs the creation or deletion of the logical tree LT within the routing table 52, and the addition or deletion of leaves L. The application 1 instructs the creation of the logical tree LT upon the initial setting of the path controller 10. Further, when the path controller 10 is soft-reset for some reason, the application 1 instructs the deletion of the logical tree LT from the routing table 52. The path controller 10 also exchanges path information with an adjacent path controller, and when receiving new path information from the adjacent path controller at the time of exchanging the path information, the application 1 instructs the addition of a leaf L based on the newly added path information. Further, as a result of receiving the path information from the adjacent path controller, if any leaf L held by the path controller 10 needs deleting, the application 1 instructs the deletion of the leaf L.

The logical tree control API 2 arbitrates between the application 1 and the logical tree manager 3. The logical tree manager 3 creates or deletes the logical tree, and adds or deletes a leaf L based on the instructions and path information outputted from the application 1 through the logical tree control API 2. The logical tree LT is stored in the routing table 52. As shown in FIG. 1, the logical tree LT is composed of the plurality of member trees MT1 and MT2. Although FIG. 4 shows only one logical tree LT in the routing table 52, two or more logical trees LT may be registered. The number of logical trees LT is determined by the kind of path information managed by the path controller 10. For example, if the path controller 10 registers path information on MAC Addresses and path information on IP addresses into the routing table 52, a logical tree LT for MAC Addresses and a logical free LT for IP addresses will be set in the routing table 52. FIG. 4 also shows the two member trees MT1 and MT2 in the logical tree LT, but three or more member trees may be included. The number of member trees MT is determined based on the number of search engines SE in the search unit 4 to be described later.

The application pico code 7 receives a frame from the outside, and transfers (performs forwarding of) the frame to the location where the frame should go. Specifically, the application pico code 7 receives a frame sent from a plurality of hosts within the same network as the path controller 10, or a frame sent from path controllers in other networks, extracts destination address information from the frame, acquires path information based on the extracted destination address information, and sends the frame based on the acquired path information.

The logical-tree search controller 6 controls the search unit 4 to use the address information extracted by the application pico code 7 as a search key so as to search the logical tree LT for a leaf that matches the search key. The two search engines SE1 and SE2 are included in the search unit 4. The search unit 4 receives an instruction from the logical tree manager 3 or the logical-tree search controller 6 to search the logical tree LT within the routing table 52. The registration information file 51 stores the logical tree ID of the logical tree LT registered in the routing table 52 and the ID of each member tree MT included in the logical tree LT. Further, as will be described later, the registration information file 51 stores the ID of a registration destination member tree with which a new leaf L is registered.

The following describes logical tree setting and editing operations using the path controller 10. The application 1 issues instructions for creation, editing, etc. of a logical tree, the logical tree control API 2 creates a message for the logical tree manager 3 based on the instructions, and the logical tree manager 3 that has received the message creates or edits the logical tree.

Figure 5:
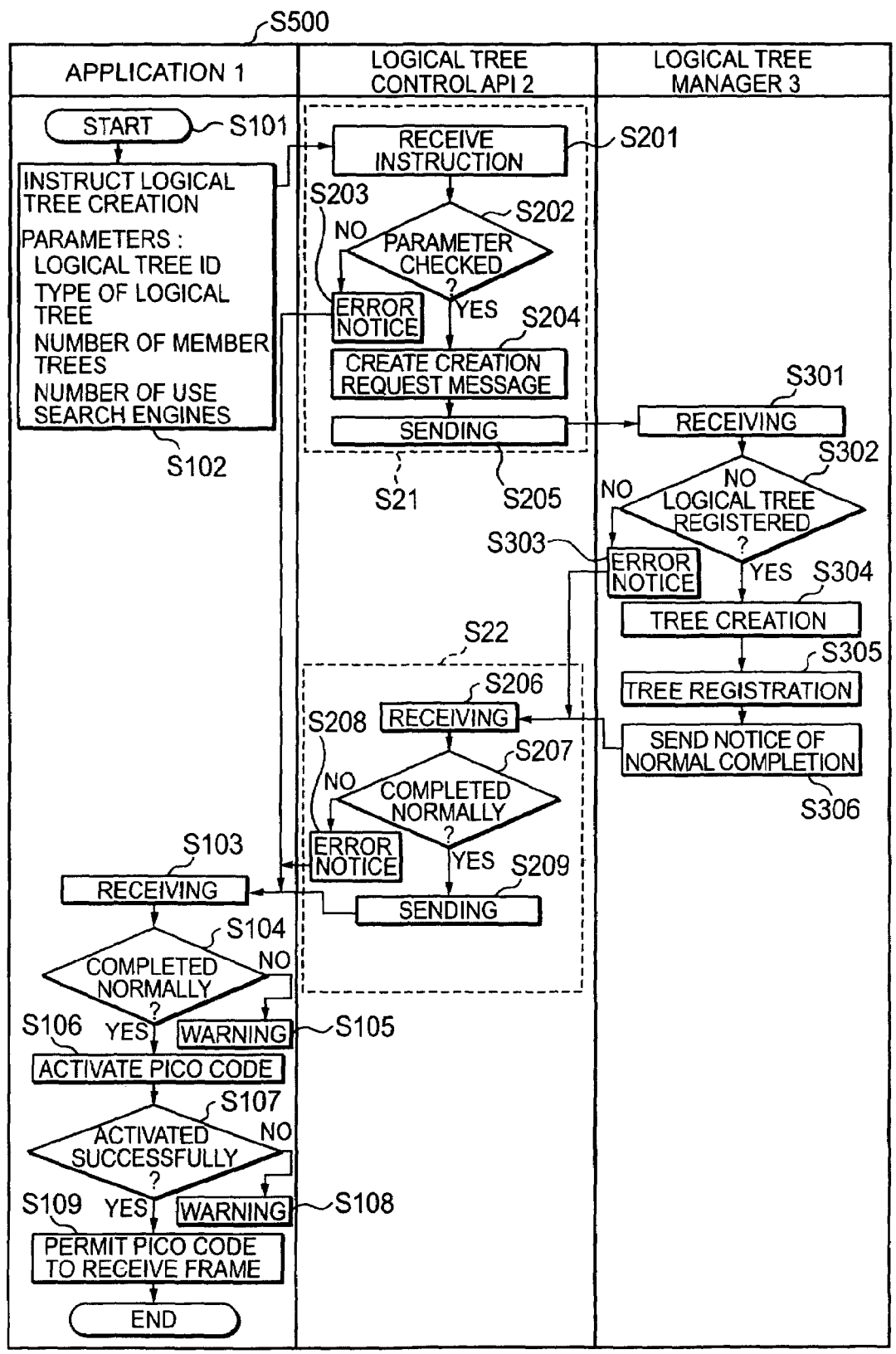
FIG. 5 It is a flowchart showing the operation of the path controller of FIG. 4.

Logical tree creation processing (S500, FIG. 5) is performed when the path controller 10 is connected to a network (at the time of initial setting). Referring to FIG. 5, the path controller 10 is connected to a network and activated (S101). At this time, the application 1 instructs the creation of a logical tree (S102). Specifically, it make a call (API call) for creating the logical tree to the logical tree control API 2. At this time, various conditions (parameters) for creating the logical tree LT are sent to the logical tree control API 2. The parameters include the ID of the logical tree LT to be created, the type of logical tree LT, and the number of member trees MT in the logical tree LT, and the number search engines used at the time of search. The type of logical tree LT is divided based on the search method used for the path search. For example, when the path controller 10 manages the path information for Mac addresses, it is preferable to carry out a path search by the FM (Full Match) method. The FM method is to compare the destination MAC address of a frame with the destination address information registered for a leaf L in the routing table 52 so that only when both fully match with each other (Full Match), a path will be decided. In this case, the type of logical tree LT is the "FM type." On the other hand, when the path controller 10 manages the path information for IP addresses, it is preferable to carry out a path search by the LPM (Longest Prefix Match) method. The LPM method is to compare the destination IP address of a frame with the destination address information registered for a leaf L in the routing table 52 so that path information for a leaf with which the matching part between the IP address and the destination address information is the longest is determined as optimum. In this case, the type of logical tree LT is the "LPM type." The number of use search engines in the parameters indicates the number of search engines SE used at the time of path search. In the path controller 10, the number of search engines used at the time of path search for a logical tree ID specified by the parameters can be set to a maximum of "2." If n search engines SE (where n is a natural number excluding 0) are included in the path controller 10, the number of use search engines may be any number not exceeding n. Further, the number of member trees MT in the parameters is any number inputted from the outside by the administrator of the path controller 10 or the like.

For example, assume that the path controller 10 registers path information on MAC addresses in the routing table 52 in the form of the logical tree LT. Assume further that the logical tree LT is so registered as to consist of two member trees MT. In this case, it is set at step S102 that the logical tree ID is any number (e.g., ID=65), the type of logical tree is "FM type," the number of member trees is "2," and the number of use search engines is "2" (because two search engines are included in the path controller 10). Then, these are sent as parameters to the logical tree control API 2.

The logical tree control API 2 receives an instruction for logical tree creation from the application 1, and performs message creation processing (S21). Specifically, the logical tree control API 2 receives the instruction for logical tree creation from the application 1 (S201), and checks the parameters in the received instruction (S202). If anything is wrong with the parameters in the instruction, the logical tree control API 2 sends an error notice to the application 1 (S203). For example, if the number of use search engines in the parameters is "3" even though only two search engines SE are included in the path controller 10, the error notice is sent. The application 1 receives the error notice (S103), considers that something unusual has occurred (S104), and informs the user or administrator of the path controller 10 of the event of an error. For example, the path controller 10 sounds a warning beep or displays, on a display screen not shown, a message to the effect that an error has occurred (S105).

On the other hand, when determining as a result of the parameter check in step S202 that the parameters are normal, the logical tree control API 2 creates a message for a logical tree creation request (S204), and sends the message to the logical tree manager 3 (S205). The message also includes the parameters received at step S201.

The logical tree manager 3 receives the request message for logical tree creation from the logical tree control API 2 (S301). Then, the logical tree manager 3 determines whether the logical tree ID in the parameters included in the received message is already registered (S302). When the logical tree ID is already registered, since it means that the logical tree LT is already registered in the routing table 52, the logical tree manager 3 determines that some kind of error is included in the received message. Consequently, the logical tree manager 3 sends an error notice to the logical tree control API 2 (S303).

The logical tree control API 2 receives the error notice from the logical tree manager 3, and performs notice processing (S22). Specifically, the logical tree control API 2 receives the error notice (S206), considers that an error has occurred (S207), and sends an error notice to the application 1 (S208). The application 1 receives the error notice (S103), considers that an error has occurred (S104), and gives a warning (S105).

On the other hand, when there is no registration of the logical tree LT as a result of determination at step S302, the logical tree manager 3 creates the logical tree LT and the member trees MT (S304). Specifically, the logical tree manager 3 creates the logical tree LT and the member trees MT in the routing table 52 based on the parameters in the received message. Since the number of member trees in the parameters is "2," the logical tree manager 3 creates the member trees MT1 and MT2 within the logical tree LT. After creating the member trees MT1 and MT2, the logical tree manager 3 registers the created logical tree LT into the routing table 52, and path control information shown in Table 2 into the registration information file 51 (S305).

TABLE 2

| LOGICAL TREE ID | MEMBER TREE ID | REGISTRATION DESTINATION MEMBER TREE ID | NUMBER OF USE SEARCH ENGINES |
|---|---|---|---|
| 65 | MT1, MT2 | MT1 | 2 |
| . | . | . | . |
| . | . | . | . |
| . | . | . | . |

Referring to Table 2, the path control information includes the registered logical tree ID, the IDs of the member trees created in the logical tree ID, the number of search engines used at the time of path search, and the registration destination member tree ID indicating the registration destination of a target leaf L. The details of the registration destination member tree ID will be described in the following section about leaf registration processing.

After registering the path control information in the registration information file 51, the logical tree manager 3 sends the notice of normal completion of creation of the logical tree LT to the logical tree control API 2 (S306).

The logical tree control API 2 receives the notice of the normal completion from the logical tree manager 3 (S206), considers that the creation of the logical tree LT has been completed normally (S207), and sends the notice of normal completion to the application 1 (S209).

After receiving the notice of the normal completion from the logical tree control API 2 (S103), the application 1 considers that the creation of the logical tree LT has been completed normally (S104). At this time, the application 1 activates the application pico code 7 (S106). Then, the application 1 determines whether the pico code 7 is activated normally (S107). When determining that it is not activated normally, the application 1 performs warning processing like in step S105 (S108). When determining that it is activated normally, the application 1 permits the application pico code 7 to receive a frame (S109). The application pico code 7 receives the frame only after receiving permission from the application 1, and receives path information from an adjacent path controller.

Through the above-mentioned operations, the path controller 10 creates the logical tree LT (and member trees MT). However, the logical tree LT created in this initial setting processing has no leaf L, that is, it is empty. To give a plurality of leaves L to the logical tree LT so that it will function as path information, the path controller 10 performs registration processing for the leaves L as shown in the following section.

Figure 6:
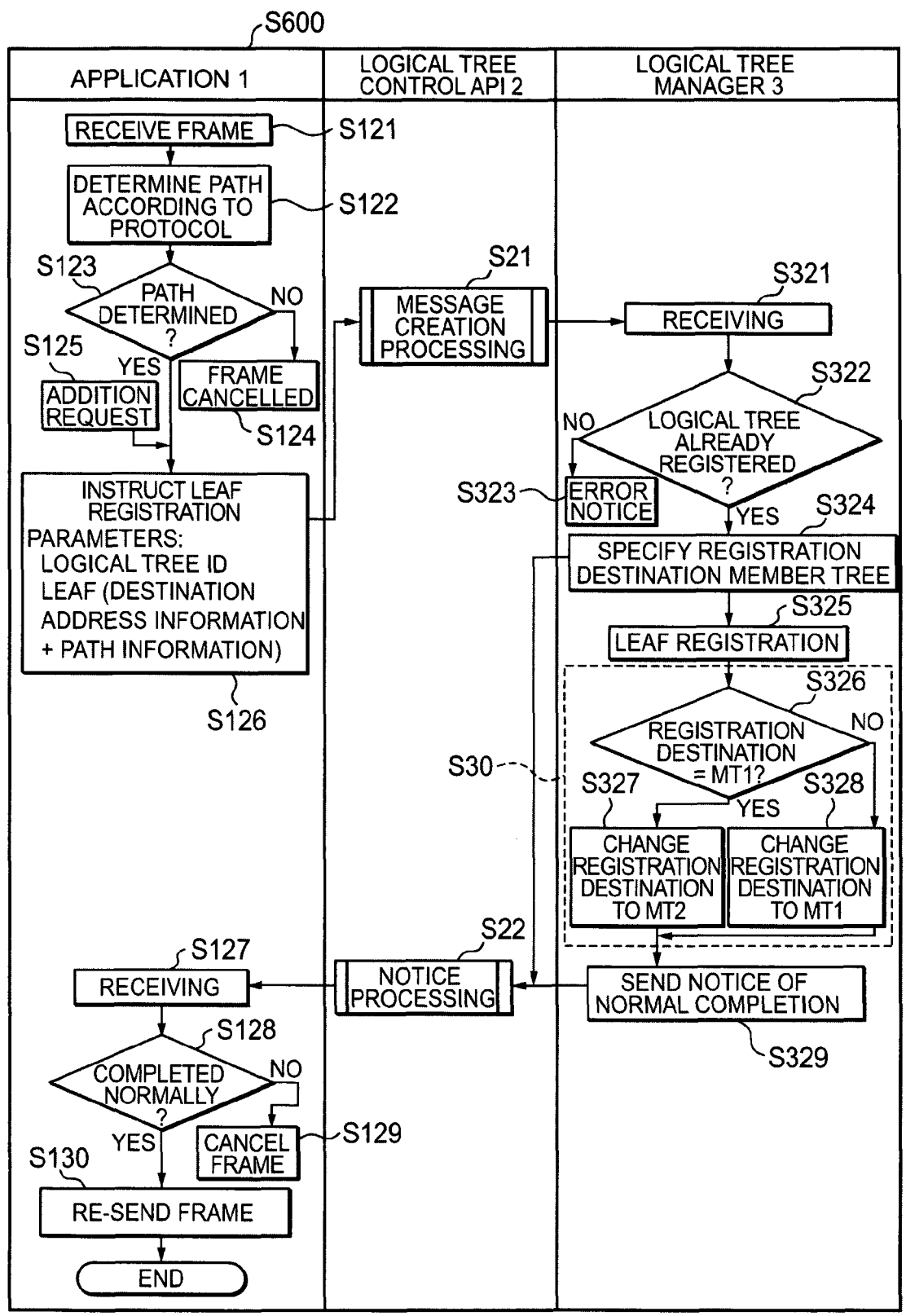
FIG. 6 It is a flowchart showing leaf registration processing by the path controller of FIG. 4.

When receiving a frame having destination address information that is not registered with the logical tree, or when exchanging path information with an adjacent path controller, the path controller 10 performs leaf registration processing (S600) for registering a new leaf L with the logical tree LT. Referring to FIG. 6, when receiving a frame the path of which cannot be searched from the logical tree LT within the routing table 52, the application pico code 7 sends the frame to the application 1. The application 1 receives the frame that was not be able to be path-searched (S121), and tries to determine the path along which the frame should be sent (S122). Specifically, the application 1 extracts destination address information from the frame. The application 1 tries to determine path information along which the frame should go according to the routing protocol to which the path controller 10 belongs using the extracted destination address information. After performing step S122, the application 1 judges whether the path information on the frame has been determined (S123). When judging that the path information was not able to be determined, the application 1 cancels the frame (S124). On the other hand, when judging that the path information was able to be determined, the application 1 instructs the registration of the leaf L to the logical tree manager 3 through the logical tree control API 2 (S126). The leaf L includes the destination address information and the path information indicating the destination to which the frame having the destination address information should go. Here, the application 1 makes an API call for the registration of the leaf L to the logical tree control API 2. Note that the application 1 selects the ID of a logical tree LT with which the leaf L should be registered from the destination address information extracted at step S122. The selected logical tree ID and leaf L (the destination address and the path information) are sent to the logical tree control API 2 as parameters.

The logical tree control API 2 receives the API call for leaf registration from the application 1, and performs the message creation processing (S21).

The logical tree manager 3 receives the message created by the logical tree control API 2 (S321), and starts leaf registration processing (S322 to S325). First, the logical tree managers reads the logical tree ID from the parameters in the message received, and determines whether the read logical tree ID is registered in the registration information file 51 (S322). When determining that it is not registered, the logical tree manager 3 sends an error notice to the logical tree control API 2 (S323). The logical tree control API 2 receives the error notice, performs the notice processing (S22), and sends the error notice to the application 1. The application 1 receives the error notice (S127), considers that an error has occurred (S128), and cancels the frame received at step S121 (S129).

On the other hand, when determining in step S322 that the logical tree ID is registered, the logical tree manager 3 specifies a registration destination member tree (S324). Specifically, the logical tree manager 3 consults the path control information within the registration information file 51 to refer to the registration destination member tree column corresponding to the logical tree ID. In the registration destination member tree column, a member tree ID having the smallest number of registered leaves L is registered. A registration method in the registration destination member tree column will be described later. For example, when the logical tree ID in the message received at step S321 is "65," since the registration destination member tree MT corresponding to the logical tree ID=65 is "MT1," the logical tree manager 3 specifies "MT1" as the registration destination member tree MT for the leaf L. Then, the logical tree manager 3 registers the leaf L with the specified member tree MT1 (S325).

After completing the registration of the leaf L, another registration destination member tree MT for the registration of the next new leaf L is specified (S30). The next new leaf L is registered in principle with a member tree MT having the smallest number of registered leaves L among the plurality of member trees MT. The specification of this member tree MT is performed by the round-robin method. Specifically, it is first determined whether the member tree MT with which the leaf L has been registered at step S325 is MT1 (S326). When it is determined that the member tree MT with which the leaf L has been registered is MT1, the registration destination of the next leaf L is set to the member tree MT2 (S327). In other words, the registration destination member tree column in the registration information file 51 in the case of the logical tree ID=65 is changed from "MT1" to "MT2." When it is determined that the member tree MT with which the leaf L has been registered is not MT1, it is considered that the leaf L has been registered at step S325 in the member tree MT2, so that the registration destination member tree MT for the next leaf L is changed to "MT1" (S328).

Although in the embodiment the number of member trees MT is two (MT1, MT2), if three or more member trees are provided, leaves L may be registered in increasing order of member tree IDs (round robin method). For example, when a leaf L is registered with the member tree MT1 at step S325, the next registration destination member tree MT is set to MT2, and when the next leaf L is registered with the member tree MT2 at step S325, the further subsequent registration destination member tree MT is set to MT3. When the number of member trees is n (where n is a natural number excluding 0), if a leaf L is registered with the member tree MTn at step S325, the next registration destination member tree MT is set to MT1. The selection of the registration destination member tree ID using the round robin method means that the selected member tree MT is a member tree MT having the smallest number of registered leaves among the plurality of member trees MT.

When a plurality of member trees MT are included in a logical tree LT, the registration destination member tree MT is changed in sequence through the above-mentioned operations each time a leaf L is registered, rather than intensive registration of leaves L in one member tree MT. Consequently, the member tree MT with which a new leaf L is registered is always a member tree MT having the smallest number of registered leaves among the plurality of member trees MT within the logical tree LT, thereby registering leaves L while uniformly distributing them to each member tree MT.

After registering the leaf L, the logical tree manager 3 sends the notice of normal completion to the logical tree control API 2 (S329). The logical tree control API 2 performs the notice processing after receiving the notice (S22), and sends the notice of normal completion to the application 1.

When receiving the notice of the normal completion (S127), the application 1 considers that the registration of the leaf L has completed normally (S128). At this time, the application 1 sends the frame received at step S121 to the application pico code 7 (S130). The application pico code 7 receives the frame and performs path search processing to be described later.

Figure 7:
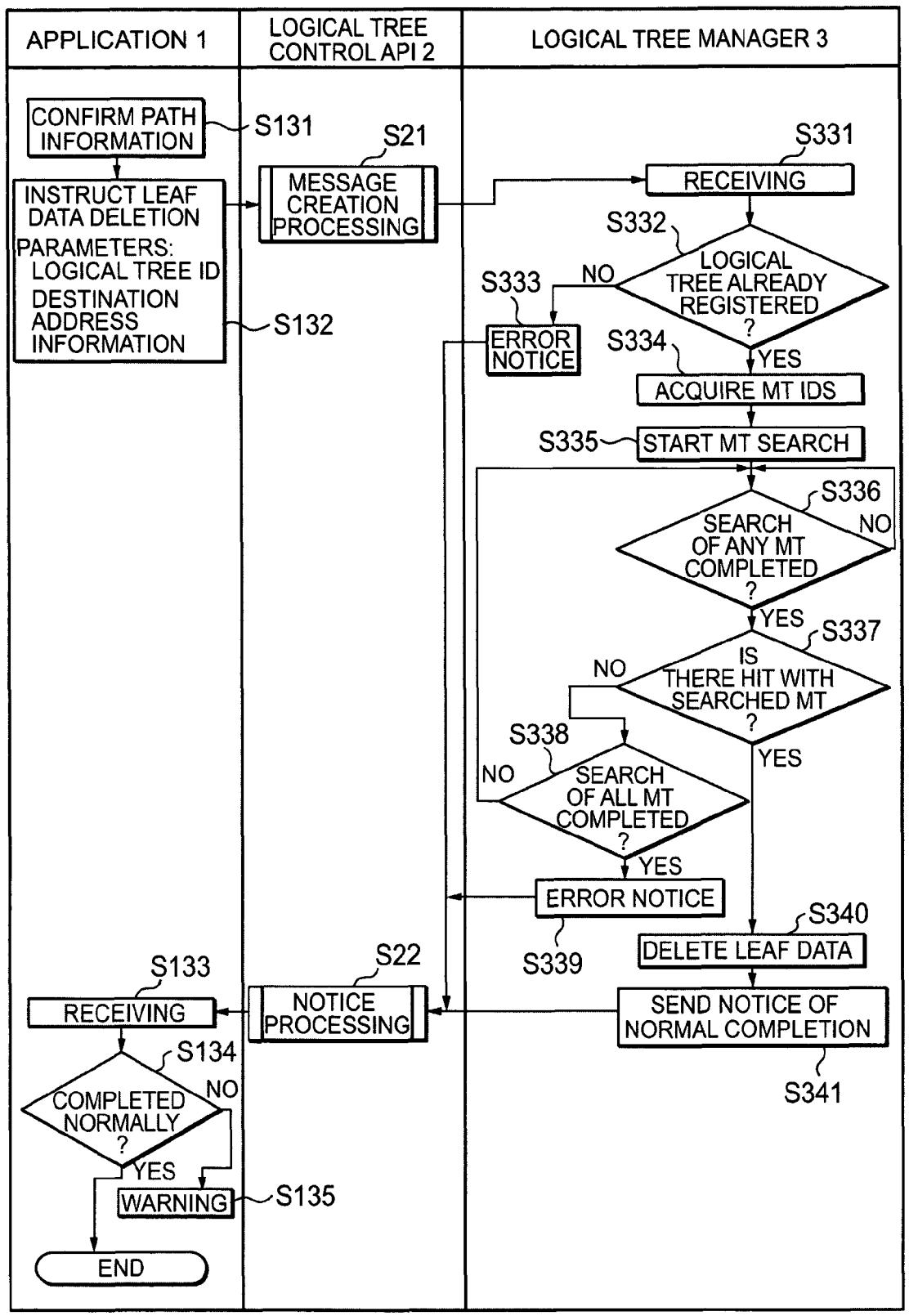
FIG. 7 It is a flowchart showing leaf deletion processing by the path controller of FIG. 4.

When the path controller 10 exchanges path information with an adjacent path controller, a new leaf L may be registered as described in the section 3.2, or a leaf L may be deleted. A leaf L is deleted when a path originally existing on the network is deleted for some reason. The following describes the operation of deletion of a leaf L. Referring to FIG. 7, after receiving path information from the adjacent path controller, the application 1 considers that a specific leaf L within the routing table 52 needs deleting (S131), and instructs the logical tree manager 3 through the logical tree control API 2 to delete the leaf L (S132). At this time, the application 1 sends, as parameters, the logical tree ID of the logical tree to which the leaf L to be deleted belongs, and the destination address information included in the leaf L. The logical tree control API 2 receives the instruction to delete the leaf L, and performs the message creation processing (S21).

After receiving a message created by the logical tree control API 2 (S331), the logical tree manager 3 determines whether the logical tree LT as the target of leaf L deletion is registered as control information (S332). Specifically, the logical tree manager 3 reads the logical tree ID from the parameters included in the message received at step S331, and consults the registration information file 51 to determine whether the read logical tree ID is registered or not (S322). When determining that the target logical tree ID is not registered, the logical tree manager 3 sends an error notice to the logical tree control API 2 (S333). The logical tree control API 2 receives the error notice, performs the notice processing (S22), and sends the error notice to the application 1. After receiving the error notice (S133), the application 1 considers that an error has occurred (S134), and performs warning processing (S135).

On the other hand, when determining that the target logical tree ID is registered, the logical tree manager 3 consults the registration information file 51 to acquire the member tree IDs belonging to the logical tree ID (S334). After acquiring the member tree IDs, the logical tree manager 3 searches for the leaf L to be deleted using the search engines SE1 and SE2 in the search unit 4 (S335). Specifically, the logical tree manager 3 sends the search unit 4 the member tree IDs (MT1, MT2) and the destination address information in the parameters received at step S331 as search keys. The search unit 4 searches for the leaf L concerned using the search engines SE1 and SE2. At this time, the search engines SE in the search unit 4 search the different member trees MT, respectively. In other words, when the search engine SE1 searches the member tree MT1, the search engine SE2 searches the member tree MT2. The number of search engines used for searching is determined by the parameters sent from the application 1 at the time of initial setting described in the section 3.1. In the embodiment, since the number of use search engines is set to "2," both the search engines SE1 and SE2 perform searching. Note that which of the member trees MT1 and MT2 the search engine SE 1 searches may be determined by the search unit 4 or based on the parameters sent from the application 1 at the time of initial setting described in the section 3.1. The logical tree structure including the plurality of member trees MT, rather than a conventional single tree structure, enables each of the plurality of search engines to search a different member tree MT, thereby reducing search time.

The logical tree manager 3 determines which of the member trees MT has been completely searched (S336). This determination is made based on the search completion report sent from the search unit 4. After completing the search of one of the member trees MT, the search unit 4 sends the logical tree manager 3 a notice that the search is completed (hereafter called the search completion notice) and the member tree ID whose search is completed. When determining that the search of either of the member trees MT is not completed, the logical tree manager 3 repeats the determination operation of step S336.

When receiving the search completion notice from the search unit 4, the logical tree manager 3 considers that the search of any of the member trees MT is completed (S336), and determines whether the leaf L to be deleted is found in the member tree MT whose search is completed (S337). Specifically, the logical tree manager 3 receives from the search unit 4 the report of whether the leaf L concerned is found or not, and makes the determination. When determining that the leaf L concerned is not found, the logical tree manager 3 then determines whether the search unit 4 has completed the search of all the member trees MT (S338). When determining that the search of all the member trees MT is completed, since it means that the leaf L to be deleted did not exist, the logical tree manager 3 sends an error notice to the logical tree control API 2 (S339). Operations after the error notice at step S339 are the same as those after the error notice at step S333.

On the other hand, when determining at step S338 that the search of all the member trees is not completed, the logical tree manager 3 returns to step S336 again to continue the search processing. When determining at step S337 that the leaf L to be deleted is found, the logical tree manager 3 deletes the leaf L concerned (S340).

After deleting the leaf L, the logical tree manager 3 sends the notice of normal completion (S341). The logical tree control API 2 that has received the notice of normal completion performs the notice processing (S22), and sends the notice of normal completion to the application 1. After receiving the notice of the normal completion (S133), the application 1 considers that the deletion of the leaf L is completed normally (S134), and ends the deletion processing for the leaf L.

In addition to deleting an already-registered leaf L in the manner mentioned above, the path controller 10 may also delete the logical tree LT. There is a soft reset as an example to delete the logical tree LT. The term "soft reset" means that the logical tree LT within the routing table 52 is deleted and re-created (initialized) without powering off the path controller 10. The following describes the logical tree deletion processing in the case of soft reset.

Figure 8:
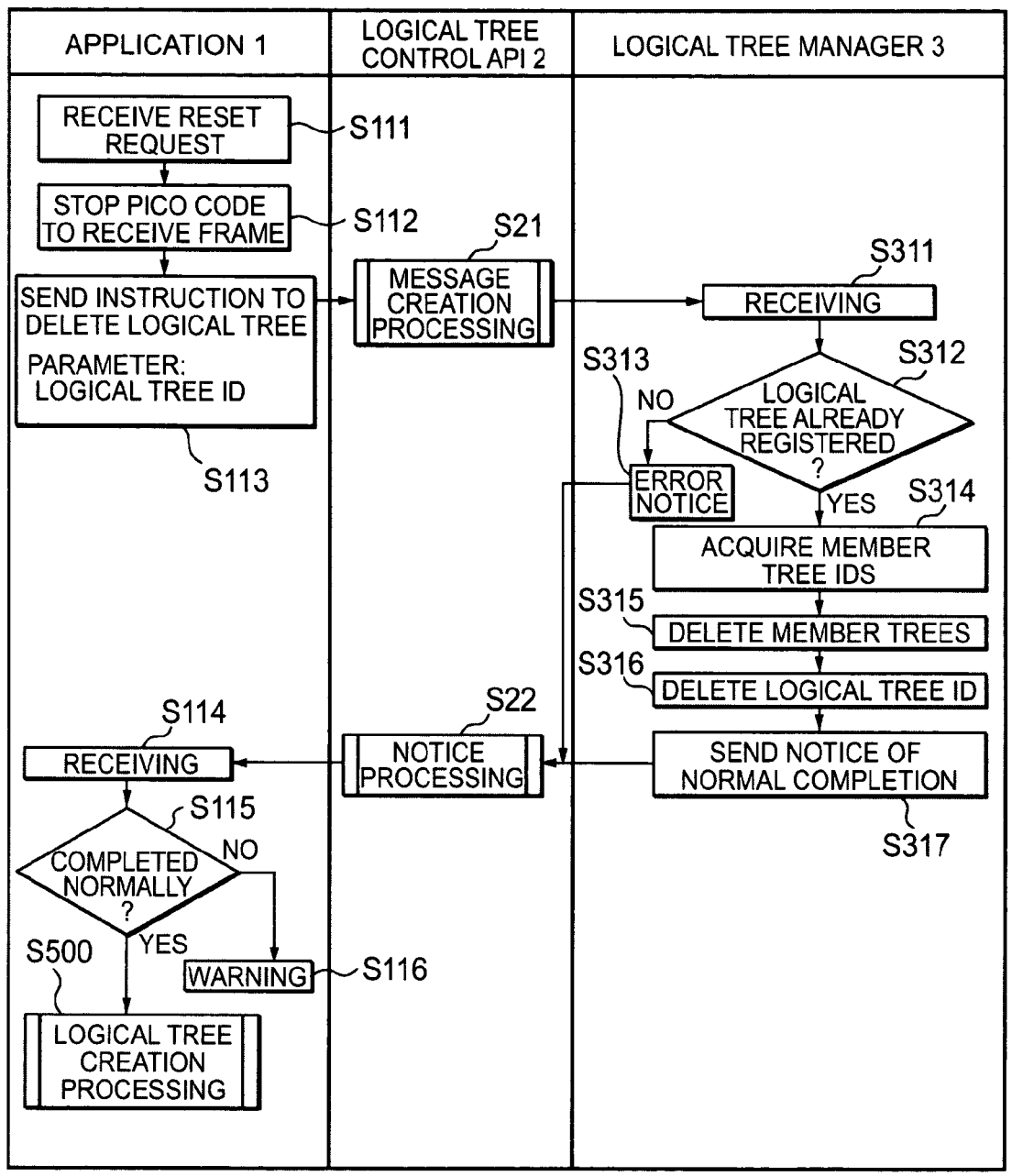
FIG. 8 It is a flowchart showing logical-tree deletion processing by the path controller of FIG. 4.

Referring to FIG. 8, the application 1 receives a soft reset request (S111). The soft reset request is inputted, for example, from the outside of the application 1 at user's discretion. Then, the application 1 instructs the application pico code 7 to stop receiving frames (S112). This is to prevent the application pico code 7 from receiving any frame from hosts connected to the path controller 10 during the soft reset. After issuing the instruction to stop receiving any frame, the application 1 instructs the logical tree control API 2 to delete the logical tree LT (S113). Specifically, the application 1 makes an API call for the deletion of the logical tree LT. At this time, the logical tree ID to be deleted is sent as a parameter.

The logical tree control API 2 that has received the instruction to delete the logical tree performs the message creation processing (S21). After receiving the message from the logical tree control API 2 (S311), the logical tree manager 3 determines whether the logical tree LT concerned is registered or not (S312). Specifically, the logical tree manager 3 reads the logical tree ID in the parameter included in the message, and determines whether the read logical tree ID is registered in the registration information file 51. When determining that there is ho corresponding logical tree ID, the logical tree manager 3 considers that a certain error has occurred, and sends an error notice to the logical tree control API 2 (S313). After receiving the error notice, the logical tree control API 2 performs the notice processing (S22) to send an error notice to the application 1. After receiving the error notice (S114), the application 1 considers that an error has occurred (S115), and performs warning processing (S116).

On the other hand, when determining that the corresponding logical tree ID is registered in the registration information file 51, the logical tree manager 3 consults the registration information file 51 to specify the member tree IDs (MT1, MT2) within the logical tree LT to be deleted (S314). After specifying the member tree IDs, the logical tree manager 3 deletes the specified member trees (S315). Specifically, the logical tree manager 3 sends the search unit 4 the member tree IDs to be deleted, and instructs the search unit 4 to delete the corresponding member trees MT. The search unit 4 that has received the instruction searches for and deletes the corresponding member trees MT.

After deletion of the member trees MT, the logical tree manager 3 deletes the logical tree ID within the registration information file 51 (S316). Then, after deleting the logical tree, the logical tree manager 3 sends the notice of normal completion to the logical tree control API 2 (S317). The logical tree control API 2 receives the notice of the normal completion, performs the notice processing (S22), and sends the notice of normal completion to the application 1.

After receiving the notice of the normal completion (S114), the application 1 considers that the deletion of the logical tree LT is completed normally (S115). At this time, the path controller 10 performs the initial setting processing (S500) as described in the section 3.1.

Through the above-mentioned operations, the path controller according to the embodiment can delete the logical tree that has been registered once.

To the path controller 10 that has registered path information with the logical tree LT, a frame is sent from a plurality of hosts within the network to which the path controller 10 is connected, or from path controllers outside the network. The path controller 10 receives a plurality of frames sent from the plurality of hosts, and transfers (performs forwarding of) each frame based on the path information searched for during the path search.

Figure 9:
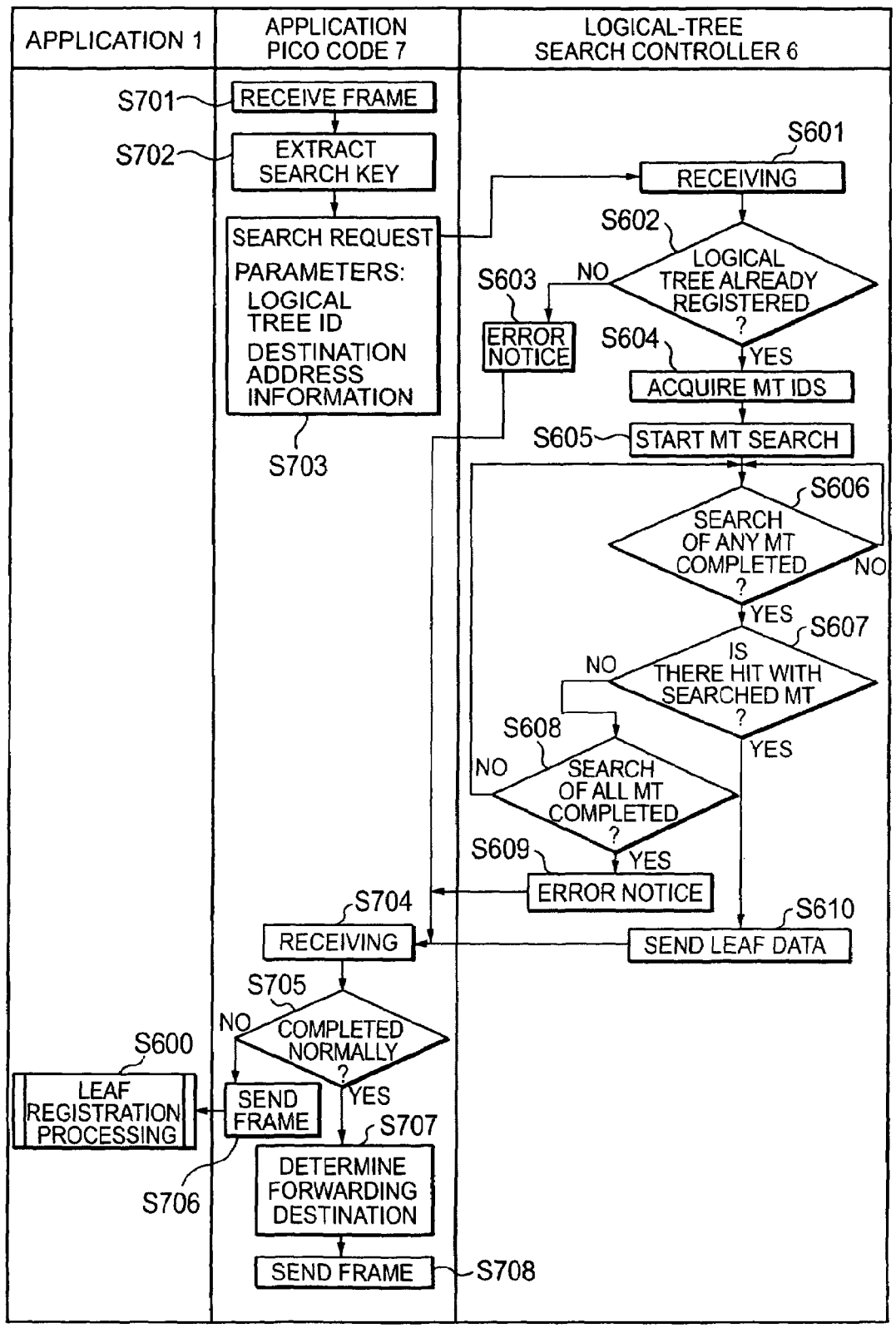
FIG. 9 It is a flowchart showing path search processing by the path controller of FIG. 4.
Figure 10:
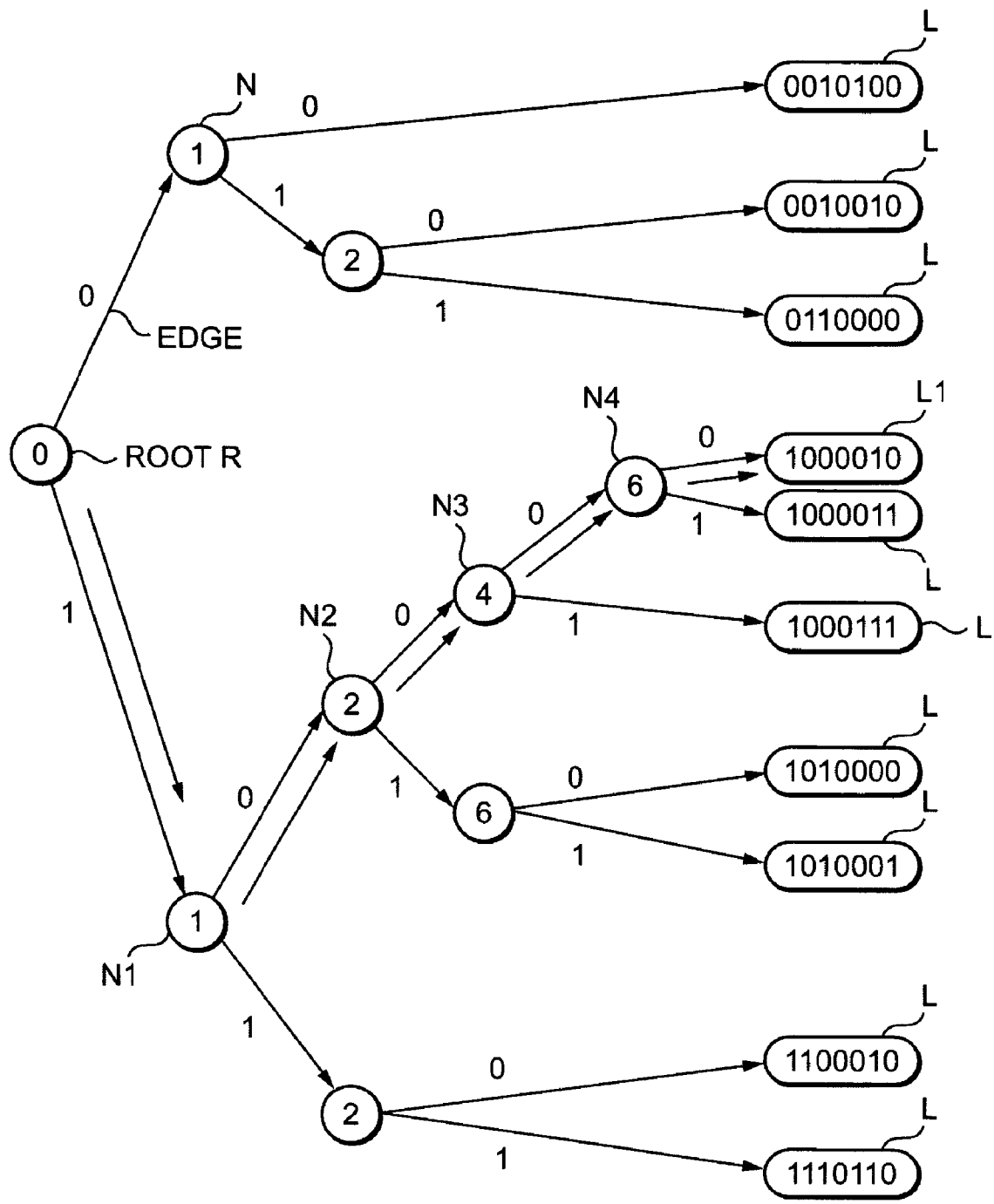
FIG. 10 It is a conceptual diagram showing a tree structure by a conventional tree method.
Figure 11:
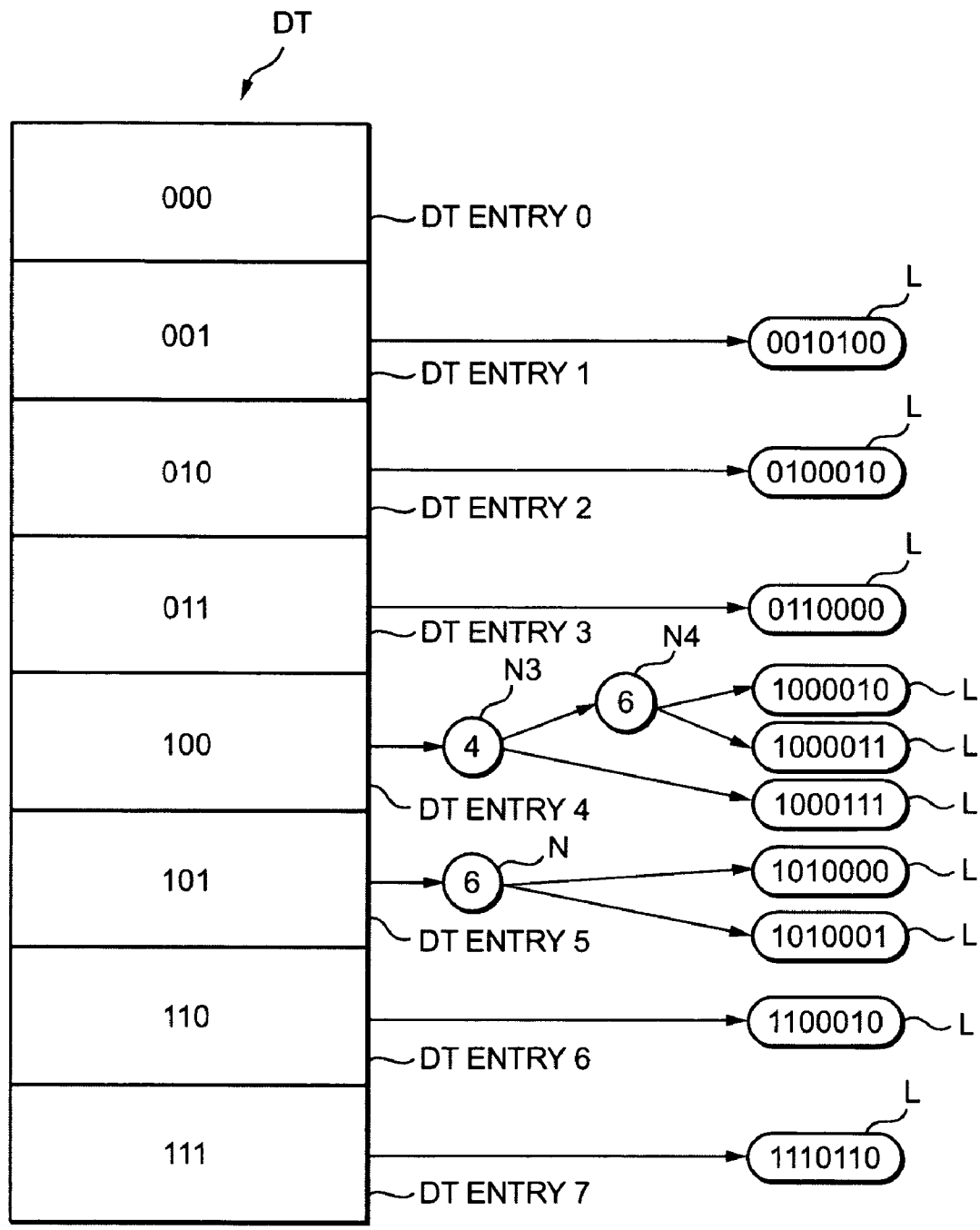
FIG. 11 It is a conceptual diagram showing a tree structure using a direct table.
Figure 12A:
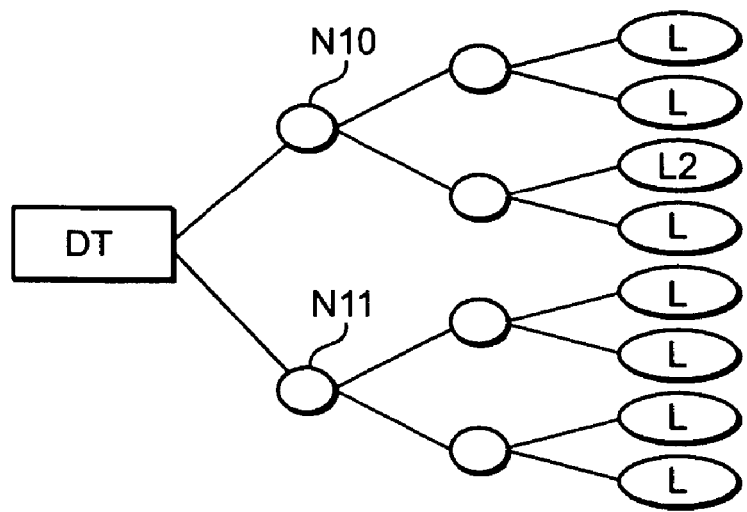
FIG. 12 It is a conceptual diagram for explaining a deviation of leaves in a tree structure.
Figure 12B:
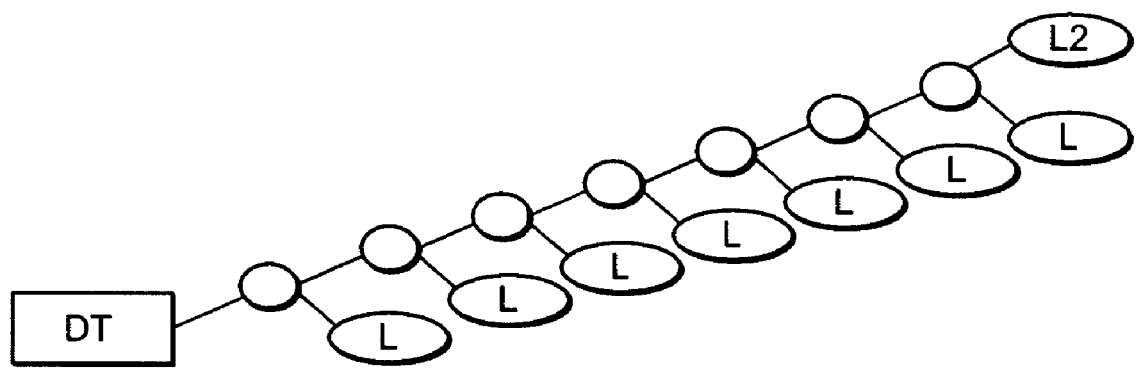

Referring to FIG. 9, the application pico code 7 receives a frame from the outside of the path controller 10 (S701). After receiving the frame, the application pico code 7 extracts destination address information from the frame as a search key (S702). Then, after extracting the search key, the application pico code 7 sends a search request to the logical-tree search controller 6 (S703). The logical tree ID to be searched and the destination address information as the search key are sent as parameters included in the search request. The logical tree ID to be searched is determined by the application pico code 7 based on the extracted destination address information.

After receiving the search request from the application pico code 7 (S601), the logical-tree search controller 6 determines whether the logical tree LT to be searched is registered (S602). Specifically, the logical-tree search controller 6 reads the logical tree ID to be searched from the parameters included in the search request received, and determines whether the read logical tree ID is registered in the registration information file 51. When determining that the logical tree ID is not registered in the registration information file 51, the logical-tree search controller 6 sends the error notice of the logical tree ID to the application pico code 7 (S603). After receiving the error notice (S704), the application pico code 7 considers that an error has occurred (S705). At this time, the application pico code 7 sends the frame received at step S701 to the application 1 (S706). The application 1 receives the frame and performs the leaf registration processing described in the section 3.2 (S600).

On the other hand, when determining at step S602 that the logical tree ID to be searched is registered, the logical-tree search controller 6 performs path search (S604 to S610). Specifically, the member tree IDs belonging to the logical tree ID in the parameters of the search request are acquired from the registration information file 51 (S604). The logical-tree search controller 6 sends the search unit 4 the acquired member tree IDs and the destination address information in the parameters of the search request, and instructs the search unit 4 to start searching (S605). Upon receipt of the search instruction, the search engines SE1 and SE2 in the search unit 4 start the search of the member trees MT1 and MT2 by using the destination address as the search key. The search engines search mutually different member trees MT for the search. For example, the search engine SE1 searches the member tree MT1, while the search engine SE2 searches the member tree MT2.

Thus, a different member tree is searched by each search engine to reduce the search time. A sequence of operations of the logical-tree search controller 6 from step S606 to step S609 are the same as those of the logical tree manager 3 from step S336 to step S339 in the leaf deletion processing (FIG. 7). When an error notice is sent at step S609 as a result of path search, it means that no leaf L corresponding to the frame received at step S701 is registered in the routing table 52. Therefore, the application pico code 7 sends the frame received at step S701 to the application 1 (S706). The application 1 receives the frame and performs the leaf registration processing described in the section 3.2 (S600).

On the other hand, when a leaf L matching the destination address information is searched for as a result of the path search, the logical-tree search controller 6 sends the searched leaf L to the application pico code 7 (S610). By receiving the leaf L (S704), the application pico code 7 considers that the path search is completed normally (S705). As a result, path information is extracted from the received leaf L, and the destination of the frame received at step S701 is determined (S707). After this determination, the frame is transferred to the destination (S708).

As described above, the path controller 10 includes the logical tree having the plurality of member trees MT within the routing table 52. Since the number of leaves registered with each member tree MT is small relative to the number of leaves registered with a single tree provided for the same root, the number of nodes passed through before reaching the leaves L during the path search can also be reduced. Further, since the plurality of member trees MT are searched using the plurality of search engines SE in such a manner that each search engine searches a different member tree MT, the search time can be considerably reduced compared to that in the conventional.

In the embodiment, the number of search engines SE is two, but more search engines may be provided in the path controller. Further, in the embodiment, the two member trees MT are created for the two search engines SE, but the number of member trees MT may be larger than that of search engines SE. For example, four member trees MT1 to MT4 may be created in the path controller 10. In this case, search may be done in such a manner that the search engine SE1 searches the member trees MT1 and MT2, and the search engine SE2 searches the member trees MT3 and MT4.

Further, the destination address information included in the leaves may be hashed using the hash function. In this case, the search key (destination address information) extracted at step S702 during the path search (FIG. 9) is hashed by the search unit 4 when searching the member trees MT (S605).

Although the above describes the embodiment of the present invention, the aforementioned embodiment is just an illustrative example of implementing the invention. Therefore, the present invention is not limited to the aforementioned embodiment, and appropriate modifications can be carried out without departing from the scope or essential characteristics of the present invention.

What is claimed is:

1. A path controller comprising:
a routing table for storing a plurality of leaves including destination address information and path information corresponding to said destination address information in a tree structure, said tree structure including a plurality of member trees having a common root, wherein said common root includes a plurality of direct tables, wherein said plurality of direct tables correspond to said plurality of member trees in such a manner that both mutually have the same combination information;
search device for searching said plurality of member trees by using the destination address information included in a received frame as a search key;
receiving and transferring means for receiving said frame and transferring said received frame on the basis of the path information included in the leaves searched for by said search device; and
creation means for creating the tree structure comprising the plurality of member trees within said routing table based on information on the number of member trees inputted from the outside; wherein said creation means receives a new leaf from the outside, and registers said new leaf with a member tree having the smallest number of registered leaves among said plurality of member trees.

2. A path controller according to claim 1, wherein
said common root includes a plurality of direct tables for recording combination information on combinations of high-order N bits (where N is a natural number) within said destination address information, and
said plurality of direct tables correspond to said plurality of member trees in such a manner that both mutually have the same combination information.

3. A path controller according to claim 1, wherein
said search device comprises a plurality of search engines provided corresponding to said plurality of member trees for searching the corresponding member trees, respectively, by using the destination address information included in said received frame as the search key.

4. A path controller according to claim 1, further comprising
a registration information file for storing registration destination information indicating a member tree with which the new leaf is registered,
wherein when receiving the new leaf from the outside, said creation means registers said new leaf based on said registration destination information, and after registration, changes said registration destination information to indicate another member tree having the smallest number of registered leaves.

5. A path controller according to claim 4, wherein
after registering said new leaf, said creation means changes said registration destination information by the round robin method.

6. A program product comprising:
a non-transitory medium on which a computer program is recorded, said computer program including
a first code module providing a routing table for storing a plurality of leaves including destination address information and path information corresponding to said destination address information in a tree structure said tree structure including a plurality of member trees having a common root, wherein said common root includes a plurality of direct tables, wherein said plurality of direct tables correspond to said plurality of member trees in such a manner that both mutually have the same combination information;
a second code module for receiving at least one frame;
a third code module for extracting the destination address information from said at least one frame;
a fourth code module for searching, with a search means, said plurality of member trees by using said destination address information extracted as the search key;
a fifth code module for transferring said frame based on the path information included in said leaf searched for when a leaf corresponding to said search key is searched;
a sixth code module for receiving a new leaf; and
a seventh code module for registering the new leaf with a member tree having the smallest number of registered leaves among said plurality of member trees.

7. The program product of claim 6, wherein:
said search means comprises a plurality of search engines, and
each of said search engines searches corresponding a member tree.

8. The program product of claim 6, further comprising:
an eighth code module for providing a registration information file for storing registration destination information indicating a member tree with which the new leaf is registered; and
a tenth code module for registering said new leaf based on said registration destination information, and after registration, the registration destination information is changed to indicate another member tree having the smallest number of registered leaves.

9. The program product of claim 8, wherein:
said registration destination information is changed by a round robin method.

* * * * *